United States Patent [19]

Furukawa et al.

[11] Patent Number: 5,352,545
[45] Date of Patent: Oct. 4, 1994

[54] BATTERY CONTAINING FOAM POLYURETHANE RESIN AND METHOD OF MAKING

[75] Inventors: Hiroshi Furukawa; Yoshito Tokunaga, both of Takatsuki, Japan

[73] Assignee: Yuasa Corporation, Osaka, Japan

[21] Appl. No.: 12,157

[22] Filed: Jan. 27, 1993

[30] Foreign Application Priority Data

Jan. 31, 1992 [JP] Japan .................. 4-046176
Sep. 22, 1992 [JP] Japan .............. 4-072223[U]

[51] Int. Cl.⁵ .............................. H01M 10/12
[52] U.S. Cl. .............................. 429/57; 429/53; 429/81; 429/86; 429/225
[58] Field of Search ............ 429/53, 57, 86, 81, 429/225

[56] References Cited

U.S. PATENT DOCUMENTS

| | | | |
|---|---|---|---|
| 4,751,154 | 6/1988 | Binder et al. | 429/53 |
| 5,173,374 | 12/1992 | Tiedemann et al. | 429/53 |
| 5,178,973 | 1/1993 | Binder et al. | 429/53 |

FOREIGN PATENT DOCUMENTS 3116565 3/1991 Japan .

Primary Examiner—Prince Willis, Jr.
Assistant Examiner—M. Nuzzolillo
Attorney, Agent, or Firm—Wegner, Cantor, Mueller & Player

[57] ABSTRACT

A sealed lead acid battery including a container; a cover connected to the container; a plurality of plate groups disposed in the container, each of the plate groups comprising a plurality of pairs of positive plates and negative plates separated, each from the other, by separators; an upper space within the container extending from the plates to the cover; a pair of straps disposed in the upper space; each of the plates having an upstanding lug; each of the lugs extending from the negative plates being connected to one of the straps; each of the lugs extending from the positive plates being connected to the other of the straps; and foam polyurethane resin filling a sufficient amount of the upper space to control the possibility of an explosion occurring due to the collection of gases within the container, the foam polyurethane having an apparent specific gravity of from 2 g/l to 50 g/l and an open cell structure.

6 Claims, 2 Drawing Sheets

BATTERY CONTAINING FOAM POLYURETHANE RESIN AND METHOD OF MAKING

BACKGROUND ART

1. Industrial Useful Field

This invention relates to a sealed lead acid battery.

2. Prior Art

Since a sealed lead acid battery is so constructed that oxygen gas produced on the positive plate at the time of charging is absorbed in the negative plate, there is generally no chance for the oxygen gas to disperse outside of the battery. When charging is carried out with a large current in the sealed lead acid battery, a produced quantity of oxygen gas on the positive plate becomes larger than an absorbed quantity of it on the negative plate, so that hydrogen gas is also produced from the negative plate. For, this reason, when the battery is completely sealed, the inside of the battery is filled with oxygen gas and hydrogen gas so as to cause an increase in inside pressure. In the event when these gases catch fire by some accident, explosion of the battery would occur.

In order to restrain or prevent such an explosion of the battery, the following methods (a) and (b), for example, are tried now. (a) Method in which a safety valve that opens when the battery inside pressure rises is installed and the produced gas is exhausted by this valve. (b) Method in which a porous material is filled in a space on upper parts of positive and negative plate groups under a cover on a container.

In the method (a), however, an extent of explosion can be lessened but breaking-into-fragments of the container or other parts by the explosion can not be prevented. A method, in which the cover is put in place after filling plastic etc. in the space on upper parts of positive and negative plate groups, is generally adopted for the method (b). However, this method includes such problems that the work becomes troublesome and manufacturing cost increases.

On the other hand, when the sealed lead acid battery is overcharged during use, the positive plate will be corroded. Many of corroded materials produced in this instance are formed on grain boundaries of lead alloy composing the positive plate. Since the corroded material increases in its volume, it will widen the grain boundary so as to elongate the positive plate. FIG. 5 is a vertical sectional view showing a case where the positive plate is elongated. In FIG. 5, 10 denotes positive and negative plate groups composed of plural positive plates 1 and negative plates 2 arranged through separators 3. A lug 2a which is formed on an upper edge of the negative plate 2 and extends upward, is joined to a strap 4 from under side. When the positive plate 1 is corroded so as to be elongated, an elongated portion 11 will sometimes contact with the lug 2a or the strap 4 as shown by FIG. 5. For this reason, a short-circuiting has sometimes occurred so as to exhaust the life of the battery before the life of plate has been exhausted.

As a method for obstructing the elongation of the positive plate 1 to prevent the short-circuiting, a method is tried, for example, in which a combed plate made of plastic having acid resistance and insulation property is inserted in such a way that each combed piece is located between adjoining lugs 2a. However, this method was able to prevent the positive plate 1 from directly contacting with the strap 4 but was not completely able to prevent the positive plate 1 from contacting with the lug 2a. Therefore, the short-circuiting could not be prevented completely. The foregoing insertion of plate 1 was carried out by hand work after putting the positive and negative plate groups 10 in a container, but spaces between the lugs 2a could not be kept constant when welding the lugs 2a by means of a cast-on method used frequently in recent years. For this reason, the above plate-insertion work was difficult and automization of the insertion work was also difficult.

This invention is made in consideration of the problems described above. Namely, an object of this invention is to provide a sealed lead acid battery which can prevent the explosion of the sealed lead acid battery, prevent short-circuiting and provide a simple method of manufacturing a sealed lead acid battery.

Summary Of The Invention

This invention provides a sealed lead acid battery, in which positive and negative plate groups composed of plural positive plates and negative plates arranged through separators, are installed in a container. Each plate has a lug extending upward on its upper edge, a lug of each positive plate and a lug of each negative plate are connected to different straps from under side respectively, and a space exists on upper parts of the positive and negative plate groups under the condition where a cover is put on the container; characterized by that a foam polyurethane resin having an apparent specific gravity of 2to 50g/l and including an open cell is filled in a space on upper parts of the positive and negative plate groups also in spaces surrounded by the straps, the adjoining lugs, and upper surfaces of the plates and separators.

Further, this invention provides a manufacturing method of a sealed lead acid battery, in which positive and negative plate groups composed of plural positive plates and negative plates arranged through separators, are installed in a container. Each plate has a lug extending upward on its upper edge, a lug of each positive plate and a lug of each negative plate are connected to different straps from under side respectively, a space exists on upper parts of the positive and negative plate groups under the condition where a cover is put on the container, and the space also includes spaces surrounded by the straps, the adjoining lugs, and upper surfaces of the plates and separators; characterized by that a stock solution of foam polyurethane resin is filled and foamed in the space on upper parts of positive and negative plate groups, and a solution is used for the stock solution of foam polyurethane resin, in which foaming can be completed within 30 seconds, and the expansion ratio and the quantity consumed are so prescribed that a volume after completion of the foaming becomes more than or equal to 80 percent of that of the space on upper parts of positive and negative plate groups and an apparent specific gravity after completion of the foaming becomes 2to 50g/l.

A hardening agent mainly composed of isocyanate and a principal agent mainly composed of polyole and including a foaming agent such as water can, for example, be prepared and mixed immediately before filling by using a mixer with a specified mixing ratio. This mixture is used as the stock solution for foam polyurethane resin.

According to the sealed lead acid battery of the present invention, the following functions and effects are obtainable. (1) The foam polyurethane resin having the open cell is filled in the space at upper parts of the positive and negative plate groups (abbreviated to "upper space" hereunder) including spaces surrounded by the strap, the adjoining lugs, and the upper surfaces of the plates and separators (abbreviated to "strap lower space " hereunder), so that the upper space is divided into many fine spaces connected to each other. For this reason, even when the gases produced during charging catch fire, there is no chance for the gases to burn quickly and extensively. Consequently, the explosion of battery due to fire that might be caught by the gases can be prevented.

(2) Since the foam polyurethane resin is filled in the strap lower space, the positive plate is prevented from elongating and contacting with the strap and the lug of negative plate. Accordingly, short-circuiting due to the elongation of positive plate can be prevented.

(3) Since the foam polyurethane resin includes an open cell structure, the gas produced at the time of overcharging is exhausted from an exhaust port of the cover through the open cell structure. Consequently, there is no possibility that the battery inside pressure increases excessively due to the gas produced at the time of overcharging and the battery is consequently broken due to the increase in battery inside pressure.

(4) When diameters of the open cells of foam polyurethane resin are excessively large, the effect of dividing the upper space is lessened so that the effect of controlling the explosion becomes insufficient. When diameters of the open cells of foam polyurethane resin are excessively small, the gas produced at the time of overcharging becomes hard to pass through so that troubles caused by the increase in battery inside pressure are apt to occur. However, in the present invention, the diameters of open cells are not excessively large because the apparent specific gravity of the foam polyurethane resin is more than or equal to 2g/l, and the diameters of open cells are not excessively small because the apparent specific gravity of the foam polyurethane resin is less than or equal to 50g/l. Therefore, the explosion of battery and troubles due to the increase in battery inside pressure can be prevented satisfactorily. Further, since the foam polyurethane resin has an apparent specific gravity of more than or equal to 2g/l , a weight of the foam polyurethane resin can be adjusted with a high precision.

(5) Since the foam polyurethane resin has acid resistance, there is no possibility that it is dissolved by the acid of the electrolyte to damage to the battery.

Therefore, the invention is not adverse to the needs of the industry for reducing the weight of batteries.

According to the manufacturing method of the sealed lead acid battery of this invention, the following functions and effects are obtainable.

(1) The stock solution of foam polyurethane resin is filled and foamed, so that the work is simple, the manufacturing cost is reduced and the automization of work becomes easy.

(2) Since the stock solution of foam polyurethane resin is one in which the foaming is completed within 30 seconds, there is no chance for the stock solution to fall in drops and disadvantageously enter surroundings and clearances of the positive and negative plate groups so that the solution is consumed economically for filling the upper space. Therefore, there is no chance for battery performance to be affected and the foam polyurethane resin is filled in the upper space with a high efficiency.

(3) The solution, in which the expansion ratio and the quantity consumed are so prescribed that the volume after completion of the foaming becomes more than or equal to 80 percent of that of the upper space and the apparent specific gravity after completion of the foaming becomes 2to 50g/l , is used as the stock solution for foam polyurethane resin, so that the following effects are obtainable. Data showing the following functions and effects are listed in Table 1.

[1] More than or equal to 80 percent of the upper space becomes filled with the foam polyurethane resin, so that the explosion of the battery is sufficiently controlled.

[2] If the apparent specific gravity after completion of the foaming is less than 2g/l, the foam polyurethane resin does not enter the strap lower space sufficiently because of a weak expansion force. However, if the apparent specific gravity after completion of the foaming is more than or equal to 2g/l in the present invention, then the strap lower space is sufficiently filled with the foam polyurethane resin. Consequently, short-circuiting due to the elongation of positive plate is prevented.

[3] When the apparent specific gravity after completion of the foaming exceeds 50 g/l, an excessive pressure is applied on the container so as to deform it because the expansion force becomes excessively large. However, in the present invention, the apparent specific gravity after completion of the foaming is less than or equal to 50 g/l so that the container is not deformed.

TABLE 1

| | Apparent specific gravity of foam polyurethane resin | | | | |
|---|---|---|---|---|---|
| | 1 g/l | 2 g/l | 10 g/l | 50 g/l | 60 g/l |
| Filling volume factor*2 of space*1 (%) | 20 | 80–100 | 100 | 100 | 100 |
| Affect | Resin does not enter strap lower space | Resin enters strap lower space | Resin enters strap lower space | Bulging to an inconspicuous degree exists on side wall of container*3 | Large bulging exists on side wall of container*3 |

*1Space surrounded by strap, adjoining lugs and upper surfaces of plates and separators

*2Filling volume factor (%) = $\dfrac{\text{Volume of foam polyurethane resin filled in space}^{*1}}{\text{Volume of space}^{*1}} \times 100$

*3Container made of polypropylene resin having wall thickness of 5 mm (6) Since the weight of the foam polyurethane resin is small, the weight of battery scarcely increases.

(4) Since the electrolyte works in such a way that water included in it accelerates the foaming, the electrolyte does not obstruct the foaming. Accordingly, the stock solution of foam polyurethane resin may be filled after the initial charging.

DETAILED DESCRIPTION OF THE INVENTION

An embodiment of this invention will be described hereunder with reference to the drawings.

Figure 1:
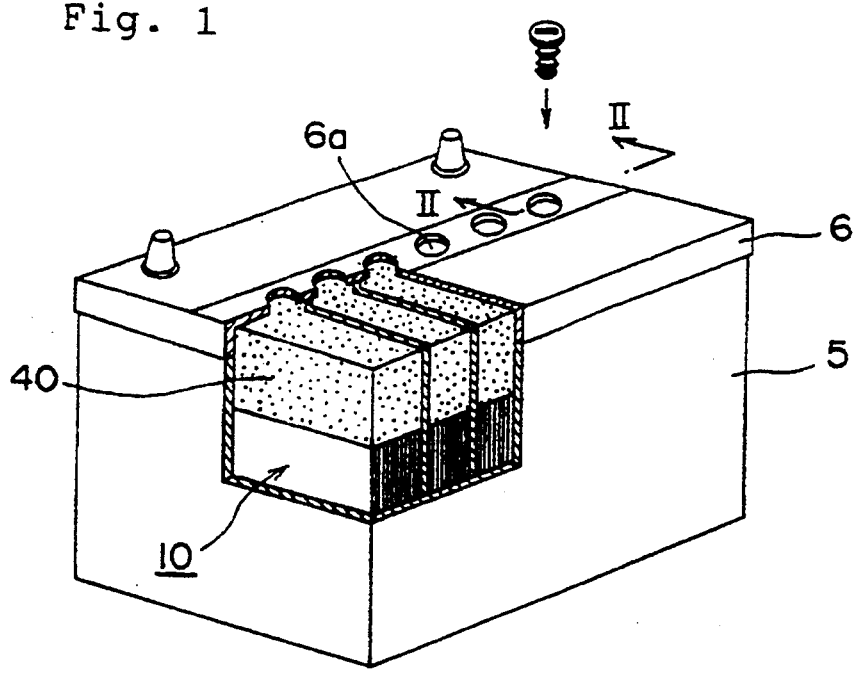
FIG. 1 is a partially fragmental oblique view showing an embodiment of sealed lead acid battery according to the present invention.
Figure 2:
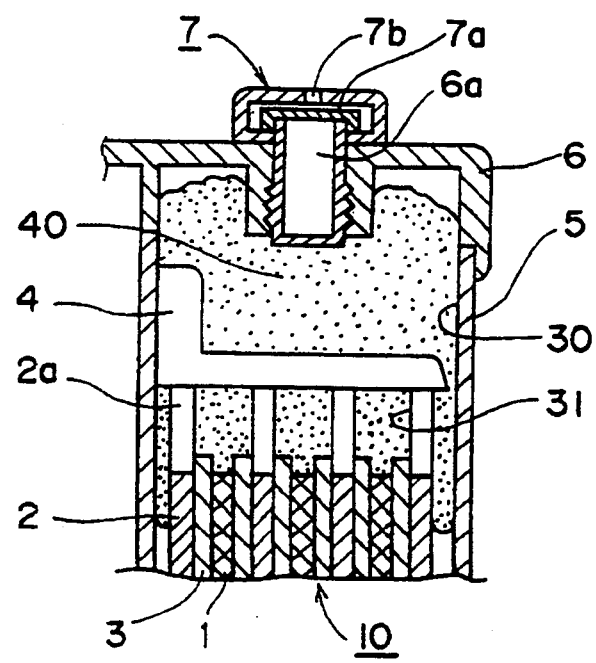
FIG. 2 is a sectional view taken on a line II—II of FIG. 1.
Figure 3:
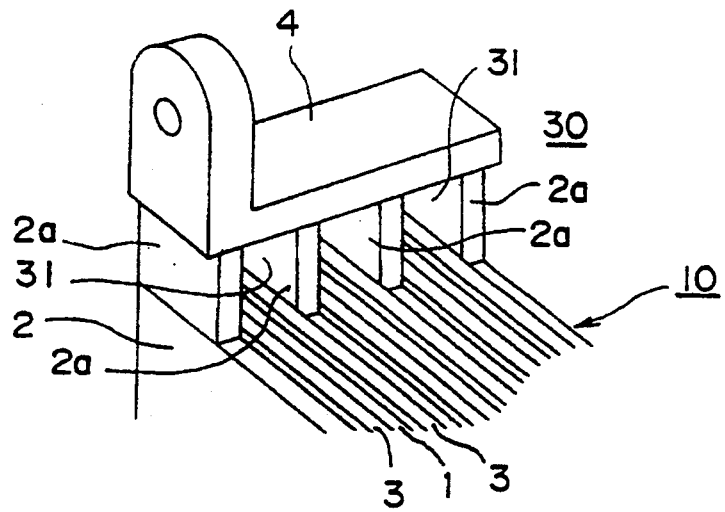
FIG. 3 is a partial oblique view of positive and negative plate groups.
Figure 5:
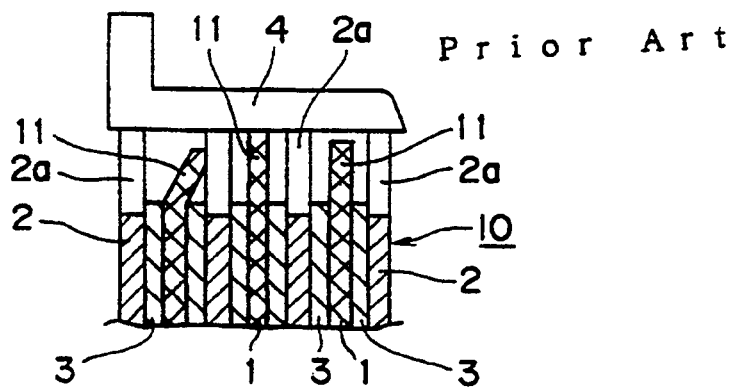
FIG. 5 is a vertical sectional partial view showing a disadvantageous state after operation of a conventional sealed lead acid battery.

FIG. 1 is a partially fragmental oblique view showing an embodiment of sealed lead acid battery according to the present invention. FIG. 2 is a sectional view taken on a line II—II of FIG. 1. In these figures, components which are similar to those of FIG. 5 are attached with the same symbols. 5 denotes a container, 6 denotes a cover, and 7 denotes a sealing plug which plugs an opening 6a a forming an exhaust opening of the cover 6. The sealing plug 7 has an exhaust valve 7a and an exhaust port 7b. Positive and negative plate groups 10 composed of plural positive plates 1 and negative plates 2 arranged through separators 3 are housed in each chamber of the container 5. As shown in FIG. 3 which is the partial oblique view of the positive and negative plate groups 10; spaces surrounded by the strap 4, the adjoining lugs 2a and upper surfaces of the plates 1 & 2 and the separators 3 (strap lower space) 31 are also included in a space on upper parts of the positive and negative plate groups 10 (upper space) 30. The space 31 opens in a lateral direction.

A foam polyurethane resin 40 is filled in the space 30 also including the space 31. The foam polyurethane resin 40 has an apparent specific gravity of 2to 50g/l and includes an open cell structure.

Figure 4:
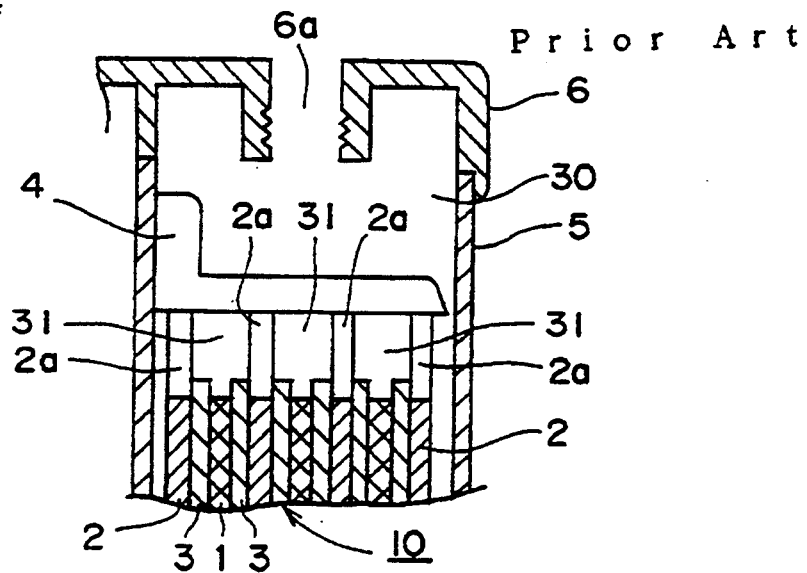
FIG. 4 is a sectional view showing a conventional sealed lead acid battery.

The sealed lead acid battery thus constructed is manufactured in the following manner. In the first place, a battery in a state of FIG. 4 is to be prepared and filled with electrolyte and subjected to initial charging. The sealed lead acid battery is in the state of FIG. 4 before being subjected to the initial charging. Since the electrolyte is absorbed and held in fine pores of active material for plates and the separators 3 so that flowable electrolyte scarcely exists in the upper parts of the positive and negative plate groups 10 even after the initial charging, the upper parts of the positive and negative plate groups 10 form a space. Next, the stock solution for foam polyurethane resin is filled from the opening 6a into the space 30. A solution, in which foaming is completed within 30 seconds, and an expansion ratio and a quantity consumed are so prescribed that the volume after completion of the foaming becomes more than or equal to 80 percent of that of the space 30 and an apparent specific gravity after completion of the foaming becomes 2to 50g/l, is used as the stock solution for foam polyurethane resin. Specifically, a hardening agent mainly composed of isocyanate and a principal agent mainly composed of polyole and including a foaming agent such as water, for example, were mixed immediately before filling with a specified mixing ratio by using a mixer. After filling the stock solution, the opening 6a was plugged by the sealing plug 7 until the foaming was completed. Blowing-off of the foam polyurethane resin from the opening 6a was thus prevented. Diameters of cells of the filled foam polyurethane resin 40 were from 0.5to 1.5mm. The stock solution may be filled in advance of the initial charging. In this case, however, much time is required for filling the resin because the electrolyte has to be filled through the foam polyurethane resin 40 and pass through the open cell of the foam polyurethane resin 40. Further, the electrolyte should be filled excessively when taking into account the amount of loss due to evaporation and electrolysis at the time of initial charging. Therefore, it is preferable that the stock solution is filled after the initial charging. The opening 6a may be plugged by a temporary sealing plug in place of the sealing plug 7, then it may be replaced by the sealing plug 7 after completion of the foaming.

According to the above-mentioned manufacturing method, it is required only to fill and foam the stock solution for foam polyurethane resin; so that the work is simple, the manufacturing cost is reduced, and the automization of the work becomes easy. Since the stock solution is one which completes its foaming within 30 seconds, there is no chance for the stock solution to fall in drops so as to disadvantageously enter surroundings and clearances of the positive and negative plate groups 10 so that the solution is consumed economically in filling the upper space 30. Therefore, there is no chance for the battery performance to be affected, and the foam polyurethane resin 40 is filled in the upper space 30 with a high efficiency. The solution, in which the expansion ratio and the quantity consumed are so prescribed that the volume after completion of the foaming becomes more than or equal to 80 percent of that of the space 30 and the apparent specific gravity after completion of foaming becomes 2 to 50g/l, is used as the stock solution for foam polyurethane resin, so that the following functions and effects are obtainable. [1] More than or equal to 80 percent of the upper space 30 become filled with the foam polyurethane resin 40, so that the possibility of explosion of the battery is sufficiently controlled. [2] The apparent specific gravity after completion of foaming is more than or equal to 2g/l, so that the space 31 is sufficiently filled with the foam polyurethane resin 40. Consequently, short-circuiting due to the elongation of positive plate 1 is prevented. [3] The apparent specific gravity after completion of foaming is less than or equal to 50g/l so that there is no chance for the container 5 to be deformed.

According to the sealed lead acid battery thus constructed, since the foam polyurethane resin 40 having the open cell is filled in the space 30 also including the space 31, the space 30 is divided into many fine spaces connected each other so that the explosion of battery due to fire due to caught gas can be prevented. Further, since the foam polyurethane resin 40 is filled in the space 31, short-circuiting due to the elongation of positive plate 1 can be prevented. Moreover, since the foam polyurethane resin 40 includes the open cell structure, the gas produced at the time of overcharging is exhausted from an exhaust port of the cover through the open cells, so that there is no possibility that the battery is broken due to the increase in interior pressure caused by the gas produced at the time of overcharging. The diameters of open cell are not excessively large or small because the apparent specific gravity of the foam polyurethane resin 40 lies within a range of 2to 50g/l. Therefore, the possibility of explosion of the battery is controlled sufficiently and the trouble due to the increase in battery inside pressure does not occur. Further, since the foam polyurethane resin 40 has the apparent specific gravity of more than or equal to 2g/l, the weight of foam polyurethane resin 40 can be adjusted with a high precision.

Occurrence of explosion was tested by using the sealed lead acid battery of this embodiment. Twenty sealed lead acid batteries of this embodiment having 45 Ah at 5 hour rate were prepared. A large quantity of hydrogen was produced in the space 30 by means of electrolysis caused by overcharging, and a spark was generated between lead wires previously attached to a lower part of the cover 6. As the result, no explosion was produced in all the batteries.

Charge/discharge cycle life tests were carried out on the sealed lead acid battery of this embodiment and a conventional sealed lead acid battery. Results are shown in Table 2. The conventional battery is in a state as shown in FIG. 4. Test conditions were set as follows. After being charged completely, the batteries were subjected to 50 repeated cycles described below and left as they were for 40 hours. One cycle consisted of a discharging for 2 seconds at 250 A, twice repeated chargings for 1 hour at a constant voltage of 14.2 V (Max. current: 70 A), a discharging for 4 minutes at 25 A, and a charging for 30 minutes at a voltage of 14.2 V (Max. current: 40 A). The battery life was judged to be exhausted when the current after 30 minutes at the last charging of cycle exceeded 5 A. For both the battery of this embodiment and the conventional battery, five test samples having 70 Ah were prepared and subjected to the tests under an ambient temperature of 60° C.

TABLE 2

|  | Battery of this embodiment | Conventional battery |
| --- | --- | --- |
| Number of life cycle (mean) | About 600 cycles | About 300 cycles |
| Cause of exhaustion of life | Rib corrosion of positive plate | Short-circuiting due to elongation of positive plate |

As seen from Table 2, according to the battery of this embodiment, the contact of positive plate 1 with the strap 4 or the lug 2a due to the elongation of positive plates was prevented so as to prolong the battery life remarkedly. The batteries were disassembled after completion of the tests, and the plate 1 was elongated to be in contact with the strap 4 in the conventional battery. However, in the battery of this embodiment, in spite of conspicuous progress of corrosion in the positive plate 1, the positive plate 1 cut into the foam polyurethane resin 40 so that changes of size and shape of the positive plate 1 were restrained.

What is claimed is:

1. A sealed lead acid battery comprising:
   a container;
   a cover connected to said container;
   a plurality of plate groups disposed in said container, each of said plate groups comprising a plurality of pairs of positive plates and negative plates separated, each from the other, by separators;
   an upper space within said container extending from said plates to said cover;
   a pair of straps disposed in said upper space;
   each of said plates having an upstanding lug;
   each of the lugs extending from said negative plates being connected to one of said straps;
   each of the lugs extending from said positive plates being connected to the other of said straps; and
   foam polyurethane resin filling a sufficient amount of said upper space to control the possibility of an explosion occurring due to the collection of gases within said container;
   said foam polyurethane having an apparent specific gravity of from 2g/l to 50 g/l and includes an open cell structure.

2. The sealed lead acid battery of claim 1, wherein said upper space further comprises a strap lower space defined by said first strap, said positive plate, said second strap, said negative plates, said adjoining lugs, and said separators, and said foam polyurethane resin substantially fills said strap lower space.

3. The sealed lead acid battery of claim 1, wherein said foam polyurethane resin fills at least 80% of said upper space.

4. The sealed lead acid battery of claim 1, wherein said foam polyurethane resin fills a sufficient amount of said upper space to prevent said positive plates from contacting said one of said straps due to elongation.

5. A method of manufacturing a sealed lead acid battery which comprises:
   providing a lead acid battery comprising:
     a container;
     a cover connected to said container;
     a plurality of plate groups disposed in said container; and
     an upper space within said container extending from said plates to said cover;
   filling a portion of said upper space with a stock solution of foamable polyurethane resin; and
   foaming said stock solution of foamable polyurethane resin such that 80% of said upper space is occupied by foam polyurethane resin having an apparent specific gravity of from 2g/1 to 50g/1 and includes an open cell structure.

6. The method of claim 5, wherein said foaming is completed in less than 30 seconds.

* * * * *